Patented Dec. 13, 1938

2,139,987

UNITED STATES PATENT OFFICE 2,139,987

DYEING AND PRINTING WITH INSOLUBLE AZO DYESTUFFS

André Wahl, Enghien, and Maurice Paillard, Paris, France, assignors of two-thirds to Societe Anonyme des Matieres Colorantes Produits Chimiques de Saint-Denis, Paris, France, a company of France No Drawing. Application December 30, 1936, Serial No. 118,408. In France January 6, 1936

11 Claims. (Cl. 8—46)

There have been described at various times azo-dyestuffs containing in the molecule an alkyl-β-naphthylamine.

Thus in German specification No. 63,477 is described the use of methyl, ethyl and amyl-β-naphthylamines as components for the manufacture of black polyazo-dyestuffs for wool. Later there have been described in German specification No. 212,973 dyestuffs obtained by combining diazotized para-nitraniline-ortho-sulphonic acid with ethyl-β-naphthylamine; these dyestuffs yield on wool shades which are particularly fast to acid. Dyestuffs of simpler constitution such as those obtained by combining methyl-β-naphthylamine with the diazo-compounds of sulphanilic acid, naphthionic acid and picramic acid are mentioned by Morgan and Evans (Journal of the Chemical Society 1919, page 1141); these dyestuffs dye wool respectively scarlet, dark red and dull purple shades.

There has also been described (see German specification No. 66,873) the use of methyl, ethyl and benzyl-β-naphthylamines for developing diazotized primuline on cotton fibre.

Finally, Morgan and Evans have stated in the paper above referred to that the combination of tetrazotized diamino-stilbene disulphonic acid with methyl-β-naphthylamine yields a substantive dyestuff which dyes cotton bluish purple.

All the dyestuffs hereinbefore referred to are therefore monoazo or polyazo-dyestuffs containing in the molecule groups which impart solubility. The presence of these groups allows the use of the dyestuffs by the customary methods for dyeing animal or vegetable fibres. On the other hand, azo-dyestuffs derived from alkyl-β-naphthylamines which contain no group which imparts solubility and consequently are insoluble in water have hitherto not been used for dyeing. Morgan and Evans (loc. cit.) have contented themselves with describing several such dyestuffs which have been prepared in substance; these are benzene-azo-methyl-β-naphthylamine which forms scarlet needles of melting point 82–83° C., and para-nitrobenzene-azo-methyl-β-naphthylamine which crystallizes in brown prisms of melting point 190–192° C.

The present invention consists in a process whereby azo-dyestuffs derived from alkyl-β-naphthylamines which contain no solubilizing group and therefore fall in the category of insoluble azo-dyestuffs can be produced directly on the fibre. The process consists in impregnating or printing the fibre with a solution of a salt of a 2-alkylaminonaphthalene-1-sulphonic acid and then developing the dyestuff by the action of a diazo-compound of a suitable base. Under these conditions the residue of the diazo-compound enters the 1-position and replaces the sulphonic acid group which is eliminated in the form of sulphuric acid. There is thus formed an insoluble dyestuff which is fixed on the fibre. The reaction may be represented by the following equation:

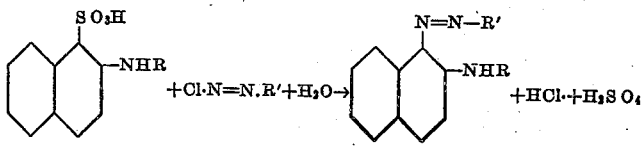

in which R represents an alkyl group which may be substituted, and R'.N=N.Cl represents a suitable diazo-compound.

Bucherer and Rauch (Journ. Prakt. Chem. T. 132, page 231, 1932) have already observed the elimination of a sulpho-group in the particular case of the acetyl derivative of 2-para-aminophenylamino-naphthalene-1-sulphonic acid. If, on the other hand, the primary amino-group is not acetylated the sulpho-group is not eliminated and no coupling can be observed.

It could not be foreseen that the 2-alkylaminonaphthalene-1-sulphonic acids would react with diazo-compounds with such an easy elimination of the sulpho-group to yield azo-dyestuffs derived from 2-alkylaminonaphthalenes.

It is known that monoazo-dyestuffs derived from 2-arylaminonaphthalenes are very sensitive to light. This sensitivity appears to be due to their tendency to undergo ring closure either to azines or to triazole compounds (Witt, Deutsche Chemische Gesellschaft T. 20, page 571 (1887), Krolpfeiffer and collaborators, Ann. Chem. 508 page 39 (1933) and 515 page 113 (1935).

The applicants have made the surprising observation that the azo-dyestuffs derived from 2-alkylaminonaphthalenes, in contrast to those derived from 2-arylaminonaphthalenes, have a considerably higher fastness to light. This property together with their high resistance to chemical agents such as acids, alkalis and chlorine renders them valuable.

The 2-alkylaminonaphthalene-1-sulphonic acids have not hitherto been described; they can be made by reaction of primary aliphatic amines and their derivatives on 2-hydroxynaphthalene-1-sulphonic acid in presence of sulphurous acid or its salts.

The combination of these products with diazo-compounds may occur in a mineral acid solution, which offers the great advantage that the diazo-compounds can be used under those conditions under which they are most stable. Finally the complete absence of any alkaline agent allows the use of these insoluble dyestuffs for dyeing animal fibres like wool and silk.

The following examples illustrate the invention:—

EXAMPLE 1

2-methylaminonaphthalene-1-sulphonic acid 100 grams of sodium 2-hydroxynaphthalene-1-sulphonate are introduced into a solution prepared by dissolving 32 grams of sulphur dioxide in 450 grams of water containing in solution 50 grams of methylamine and the whole is heated at 125–130° C. in an autoclave provided with a stirrer. The pressure rises to about 4 kilos; after 18 hours the reaction mixture is filtered if necessary and acidified in the cold by means of a mineral acid. The precipitate so obtained is separated and purified by dissolution in sodium carbonate solution and reprecipitation. 2-methylaminonaphthalene-1-sulphonic acid is obtained in the form of crystals which are sparingly soluble in cold water and more soluble in boiling water. Its sodium salt is very soluble in water.

Analysis of the free acid:

Found:
 $C=56.14\%$   $H=4.88\%$   $N=5.85\%$.
Calculated for $C_{11}H_{11}O_3NS$:
 $C=55.70\%$   $H=4.64\%$   $N=5.91\%$.

Sodium salt dried in a vacuum at 100° C.:

Found:
 $Na=8.9-8.75\%$.
Calculated:
 $Na=8.88\%$.

If in this example instead of methylamine there is used a homologue thereof such as butylamine, amylamine and so on, there are obtained the corresponding alkylamino derivatives which can be isolated in the form of their sodium salts.

EXAMPLE 2

2-butylaminonaphthalene-1-sulphonic acid 130 grams of sodium 2-hydroxynaphthalene-1-sulphonate of 85 per cent. strength and a solution containing 110 grams of n. butylamine and 32 grams of sulphur dioxide in 450 cc. of water are heated at 125° C. in an autoclave provided with a stirrer. After about 30 hours the reaction mixture is allowed to cool, 150 cc. of caustic soda solution of 40° Bé. are added and the amine which has not reacted is expelled by steam distillation. The product suitably diluted is then cooled and allowed to crystallize. The crystalline needles thus formed can be redissolved in boiling methyl alcohol and from the solution, after cooling and addition of ether, there separate crystals of pure sodium 2-butylaminonaphthalene-1-sulphonate. The crystals are freely soluble in water and in alcohol but insoluble in ether. Analysis gave the following results:

Found:
 $N=4.41\%$, $4.45\%$   $S=10.7\%$   $Na=7.46\%$.
Calculated for $C_{14}H_{16}NSO_3Na$:
 $N=4.65\%$   $S=10.6\%$   $Na=7.63\%$.

The aqueous solutions of the salt yield a white crystalline precipitate of the sulphonic acid when treated with mineral acids.

In like manner the amyl derivative can be prepared by substituting amylamine for butylamine in this example.

Sodium 2-amylaminonaphthalene-1-sulphonate crystallizes in the form of white needles which are soluble in water, methyl alcohol and ethyl alcohol and insoluble in ether. The addition of mineral acids to its cold aqueous solutions yields a crystalline precipitate of the free sulphonic acid.

Analysis of the sodium salt:

Found:
 $N=4.40\%$, $4.39\%$   $S=10.73\%$
  $Na=6.59\%$, $6.55\%$.
Calculated for $C_{15}H_{18}NSO_3Na$:
 $N=4.45\%$   $S=10.15\%$   $Na=7.3\%$.

In the same manner there may be substituted for one of the hydrogen atoms of the amino-group of β-naphthylamine sulphonic acid a cyclic radical such as cyclohexyl.

EXAMPLE 3

Sodium 2-cyclohexylaminonaphthalene-1-sulphonate 130 grams of sodium 2-hydroxynaphthalene-1-sulphonate of 85 per cent. strength and a solution containing 150 grams of cyclohexylamine and 32 grams of sulphur dioxide in 450 cc. of water are heated together at 125° C. in an autoclave provided with a stirrer. After about 30 hours the whole is allowed to cool, rendered alkaline by the addition of 150 cc. of caustic soda solution of 40° Bé. and diluted to 1 litre; then the amine which has not reacted is expelled by steam distillation. On cooling the solution freed from amine a certain quantity of the sodium salt of the desired product separates. After this has been removed the sulphurous acid is expelled by progressive addition of a mineral acid to the solution whilst this is heated to a temperature close to the boiling point. After the sulphurous acid has been expelled the liquid is cooled whereby a further quantity of the crystalline sodium salt separates.

This sodium salt is dissolved in warm methyl alcohol and is caused to crystallize from the lukewarm solution by the addition of ether. Sodium 2-cyclohexylaminonaphthalene-1-sulphonate forms white crystals which are soluble in water and in alcohol and insoluble in ether. The free sulphonic acid can be precipitated from the aqueous solution of the salt by addition of a mineral acid.

Analysis:

Found:
 $N=3.99\%$   $S=9.45\%$   $Na=6.55\%$.
Calculated for $C_{16}H_{18}NSO_3Na$:
 $N=4.28\%$   $S=9.8\%$   $Na=7.03\%$.

Finally it is also possible to introduce into the amino-group of the naphthylamine sulphonic acid an alkyl-group which is itself substituted, such as an aminoalkyl-group. Thus by replacing in the preceding examples the primary amine by a diamine containing a primary amino-group such as ethylene diamine one atom of hydrogen is replaced by the residue —CH₂—CH₂—NH₂ with the formation of 1-aminoethylaminonaphthalene-1-sulphonic acid.

EXAMPLE 4

2-aminoethylaminonaphthalene-1-sulphonic acid 250 grams of sodium 2-hydroxynaphthalene-1-sulphonate are mixed with 240 grams of a solution of ethylene diamine of 75 per cent. strength which has been diluted with 600 cc. of water and in which 64 grams of sulphur dioxide have been dissolved. The mixture is heated at 130° C. in an autoclave provided with a stirrer. After about 20 hours the reaction liquid is filtered if necessary and there are added to it 280 cc. of hydrochloric acid of 22° Bé. The white crystalline precipitate which deposits is removed, washed with salt water, dried and recrystallized from boiling water.

Its analysis corresponds with the formula

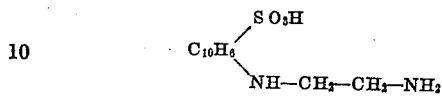

which is that of an aminoethyl derivative.

Found:
C=54.32%   H=5.22%   N=10.42%.

Calculated:
C=54.13%   H=5.26%   N=10.52%.

The presence of a free amino-group is shown by the formation of acetyl, benzoyl and sulphonyl derivatives by the action respectively of acetic anhydride, benzoyl chloride or para-toluene sulpho-chloride under the usual conditions.

Analysis of acetyl derivative, sodium salt:

Found:
C=51.35%   H=4.96%
N=8.36%   Na=7.04%.

Calculated for $C_{14}H_{15}O_4N_2SNa$:
C=51.91%   H=4.55%
N=8.48%   Na=6.97%.

By reason of the well-known instability of a sulphonic acid group in 1-position it could not be foreseen that under these conditions this group would not be completely eliminated, the more so because under even milder conditions the reaction of ethylene diamine on 2-hydroxynaphthalene-1-carboxylic acid proceeds with the simultaneous elimination of the carboxyl group, even at a temperature of 90° C., as is indicated in Example 5 of German specification No. 431,167.

Since this elimination of the carboxyl group also occurs when this group occupies the 3-position, in which its stability is generally much greater, the fact that in the case of 2-hydroxynaphthalene-1-sulphonic acid the sulphonic acid group is preserved is quite unexpected.

EXAMPLE 5

Application in dyeing

A cotton fibre or fabric is impregnated in a bath containing, for example, per litre 20 grams of sodium 2-methylaminonaphthalene-1-sulphonate, 10 grams of urea and 50 grams of glycerine. The cotton is pressed and dried at 50–60° C. and the dyestuff is then developed by treatment in a diazo solution of concentration corresponding, for example, with 5 grams of the base per litre. The diazo solution may be used according to circumstances in the form in which it is obtained by diazotization under the usual mineral acid conditions or after it has been partially or completely neutralized. The dyestuff is developed immediately. Then the goods are pressed, washed and soaped. Depending on the diazo-compound used there may be obtained the following shades:—

| | |
|---|---|
| Ortho-chloraniline | Orange. |
| 2:5-dichloraniline | Orange red. |
| 1-amino-2-nitro-4-chloro-3:6-dimethylbenzene | Scarlet red. |
| Ortho-chloro-para-nitraniline | Dark violet. |
| Ortho-bromo-para-nitraniline | Dark violet. |

If in the foregoing example sodium 2-methyl-aminonaphthalene-1-sulphonate is replaced by another derivative there are obtained more or less different results. For example, in the case of sodium 2-amino-ethylaminonaphthalene-1-sulphonate or its derivatives the following shades are obtained:—

| Coupling component | Diazo-compound of— | Shade |
|---|---|---|
| Aminoethylaminonaphthalene sulphonate | Ortho-chloro-para nitraniline | Violet. |
| Acetylaminoethylamino-naphthalene sulphonate | 2:4-dinitraniline | Blue. |
| Benzoylaminoethylamino - naphthalene sulphonate. | do | Do. |
| Do | Ortho-chlor-para-nitraniline | Do. |
| Do | Ortho-bromo-para-nitraniline | Do. |
| Do | 2:5-dichloraniline | Red. |
| Do | 1-amino-2-nitro-4-chloro-3:6-dimethyl-benzene | Do. |
| Sulphonylaminoethylamino - naphthalene sulphonate. | Ortho-bromo-para-nitraniline | Violet. |
| Do | Ortho-chloro-para-nitraniline | Do. |
| Do | 2:5-dichloraniline | Red. |

Further examples of shades are as follows:

| Coupling component | Diazo-compound of— | Shade |
|---|---|---|
| Sodium 2-amylamino-naphthalene-1-sulphonate | Ortho-chloraniline | Orange. |
| Do | 2:5-dichloraniline | Red. |
| Do | 1-amino-2-nitro-4-chloro-3:6-dimethyl-benzene | Scarlet. |
| Do | Ortho-chloro-para-nitraniline | Violet. |
| Do | Nitrocresidine | Do. |
| Sodium 2-cyclohexyl-aminonaphthalene-1-sulphonate. | Ortho-chloraniline | Orange. |
| Do | 2:5-dichloraniline | Red. |
| Do | 1-amino-2-nitro-4-chloro-3:6-dimethyl-benzene | Scarlet. |
| Do | Ortho-chloro-para-nitraniline | Violet. |
| Do | Nitrocresidine | Do. |

EXAMPLE 6

Application in printing

The products can be used for printing on fabrics in various ways. Thus, for example, a fabric which has been impregnated and dried as indicated in the preceding example may be printed with a suitably thickened diazo-solution which according to circumstances may be acid or may be partially or completely neutralized. The dyestuff is developed immediately.

It is also possible to print the fabric with a paste containing the suitably thickened coupling component and then after the material has been dried to develop the dyestuff by treatment in a solution of a diazotized base.

However, there may also be printed on the fabric a thickened mixture containing both the coupling component and a compound containing an amine in a form from which the active diazocompound is liberated by passage through an acid bath. For this purpose there may be used a diazoamino-compound or a nitrosamine compound. Yet a simpler procedure consists in using a mixture containing the coupling component, the primary amine, sodium nitrite and a thickening agent. After the material has been dried the dyestuff is developed by treatment in a mineral acid medium.

For example, 2.2 grams of 2-bromo-4-nitraniline are made into a paste with 3 cc. of sulphoricinate of 50 per cent strength, 5 grams of glycerine and 25 cc. of water; then there is added a solution of 4 grams of sodium 2-benzoylaminoethylaminonaphthalene-1-sulphonate and 0.8 gram of sodium nitrite in 15 cc. of water and the whole is mixed with 40 grams of neutral starch tragacanth thickening. A fabric of vegetable or animal fibrous material is printed with this paste, dried at 60° C. and then passed through a mineral acid bath, for example, hydrochloric acid containing 1 or 2 per cent of HCl, in order to develop the dyeing. There is immediately produced a violet shade which becomes pure blue after washing and treating with a boiling soap solution.

It will be understood that all the foregoing examples serve merely to illustrate the process and that the proportions therein indicated may be more or less varied.

What we claim is:

1. A method for directly producing insoluble azodyestuffs on fibre, which comprises impregnating the fibre at least locally with a 2-amino-naphthalene-1-sulphonate wherein the amino group has a substituent comprising a saturated hydrocarbon radical directly attached to said amino group and no water-solubilizing group other than the substituent in position 1 is present; and replacing the substituent in position 1 by a —N=N—R group, R being the radical of an amino base R—NH₂ which is free from water solubilizing group.

2. A method for directly producing insoluble azodyestuffs on fibre, which comprises impregnating the fibre at least locally with a 2-amino-naphthalene-1-sulphonate wherein the amino group has a substituent comprising a saturated hydrocarbon radical directly attached to said amino group and no water-solubilizing group other than the substituent in position 1 is present; then impregnating the fibre at least locally with a diazotized amino base which is free from water-solubilizing group, so as to develop the dyestuff.

3. The method of claim 2, the diazotized amino base being used as a solution the pH value of which is not larger than 7.

4. A method for directly producing insoluble azo-dyestuffs on fibre, which comprises impregnating the fibre at least locally with a neutral solution of a 2-amino-naphthalene-1-sulphonate wherein the amino group has a substituent comprising a saturated hydrocarbon radical directly attached to the amino group, and no water solubilizing group other than the substituent in position 1 is present; then impregnating the fibre at least locally with a non-alkaline solution of a diazotized amino base which is free from water solubilizing group, so as to develop the dyestuff.

5. A method for directly producing insoluble azo-dystuffs on fibre, which comprises impregnating the fibre at least locally with a mixture including (a) a 2-amino-naphthalene-1-sulphonate wherein the amino group has a substituent comprising a saturated hydrocarbon radical directly attached to said amino group and has no water-solubilizing group other than the substituent in position 1, and (b) a diazotized amine which is free from water solubilizing group, in the form of a water-soluble stable compound which is convertible into the active diazo compound for coupling with the sulphonate; and subsequently liberating the said active diazo compound from the water-soluble stable compound, so as to develop the dyestuff.

6. The method of claim 5, the second step comprising exposing the impregnated fibre to the action of an acid developing medium.

7. The method of claim 5, the amino base adapted to be coupled with the sulphonate being used as a diazo-amino-compound; and the second step comprising exposing the impregnated fibre to the action of an acid developing medium.

8. A method for directly producing insoluble azo-dyestuffs on fibre, which comprises impregnating the fibre at least locally with a mixture including a 2-amino-naphthalene-1-sulphonate wherein the amino group has a substituent comprising a saturated hydrocarbon radical directly attached to said group and has no water-solubilizing group other than the substituent in position 1 and an amino-base which is free from water solubilizing group; and exposing the fibre thus impregnated to the action of nitrous acid for coupling the base with the sulphonate.

9. A method for directly producing insoluble azo-dyestuffs on fibre, which comprises impregnating the fibre at least locally with a mixture including (a) a 2-amino-naphthalene-1-sulphonate wherein the amino group has a substituent comprising a saturated hydrocarbon radical directly attached to said amino group and has no water-solubilizing group other than the substituent in position 1, (b) an amino base which is free from water solubilizing group, and (c) a nitrite; and exposing the fibre thus impregnated to the action of a medium including an inorganic acid.

10. The method of claim 9, the mixture (a) being neutral; the amino base adapted to be coupled with the sulphonate being used as a non-alkaline solution thereof; and the second step of the method comprising causing said base to react with nitrous acid.

11. A method for directly producing insoluble azo-dyestuffs on fibre, which comprises impregnating the fibre at least locally with a non-alkaline mixture including (a) a 2-amino-naphthalene-1-sulphonate wherein the amino group has a substituent comprising a saturated hydrocarbon radical directly attached to said amino group, and has no water-solubilizing group other than the substituent in position 1, (b) an amino base adapted to be coupled with said sulphonate, and (c) a nitrite; and exposing the fibre thus impregnated to the action of a medium including an inorganic acid.

ANDRÉ WAHL.
MAURICE PAILLARD.